Sept. 11, 1962 E. N. LENK ETAL 3,054,090

COINCIDENCE CIRCUIT

Filed Aug. 7, 1958 2 Sheets-Sheet 1

INVENTORS
E. N. LENK
J. G. WEEKS
Q. W. WIEST
BY R. P. Miller
ATTORNEY

COINCIDENCE CIRCUIT

Filed Aug. 7, 1958 2 Sheets-Sheet 2

INVENTORS
E. N. LENK
J. G. WEEKS
Q. W. WIEST
BY R. P. Miller
ATTORNEY

United States Patent Office 3,054,090
Patented Sept. 11, 1962

3,054,090

COINCIDENCE CIRCUIT

Elmer N. Lenk, Westchester, John G. Weeks, Downers Grove, and Quentin W. Wiest, Western Springs, Ill., assignors to Western Electric Company, Incorporated, New York, N.Y., a corporation of New York
Filed Aug. 7, 1958, Ser. No. 753,703
2 Claims. (Cl. 340—149)

This invention relates to coincidence circuits and more particularly to a circuit for comparing binary coded signals and for producing an output pulse or other indication when coincidence of the signals is obtained.

It is a primary object of this invention to provide a coincidence circuit for sequentially comparing a preselected binary number with a plurality of binary coded signals being produced by a binary coding device.

It is another object of this invention to provide a coincidence circuit which will provide a voltage pulse when coincidence of the signals being compared is obtained.

It is a further object of this invention to provide a coincidence circuit having a register therein within which a preselected binary number can be reproduced and then compared to signals emanating from a binary coding device.

With these and other objects in view, the present invention contemplates a circuit including a register formed of a bank of relays in which a preselected binary number can be reproduced. Each relay represents a single binary digit with the actuated relays representing the binary digit "1" and the unactuated relays representing the binary digit "0." The binary coded signals to be compared with the number reproduced in the register are applied to a plurality of input terminals and through contacts on the register relays to a pair of vacuum tubes. One of these tubes is conductive at all times except when a coded signal having the digit "1" in positions corresponding to equivalent digits in the preselected number is applied to the input terminals and the other of these tubes is conductive at all times except when a coded signal having the digit "0" in positions corresponding to equivalent digits in the preselected number is applied to the input terminals. Simultaneous non-conduction of both tubes indicates that the signals being compared are identical and causes a potential rise at their common plate connection which may be utilized to start or stop electrical equipment, yield a physical or electrical indication of coincidence, etc.

Figure 1:
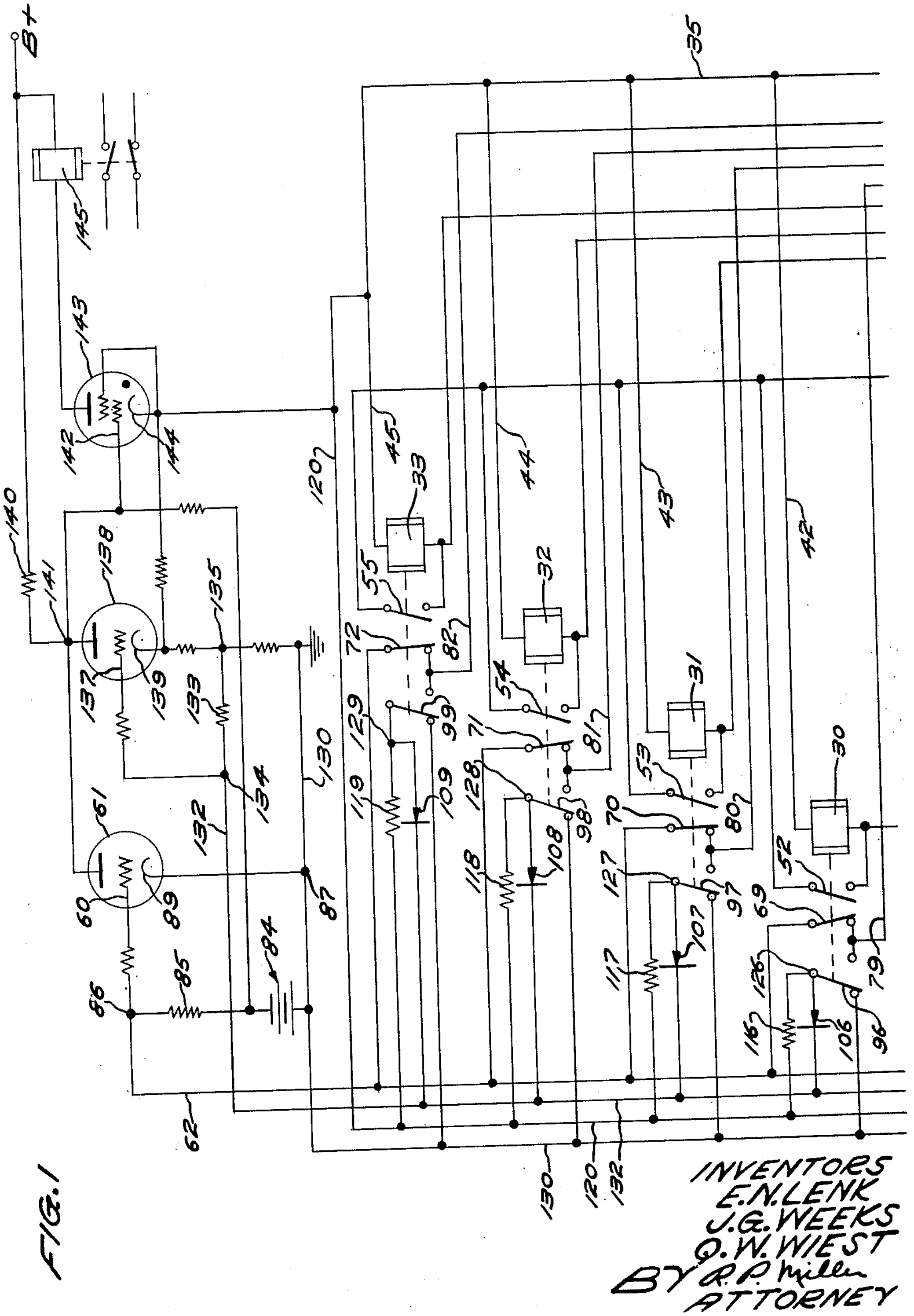
Figure 2:
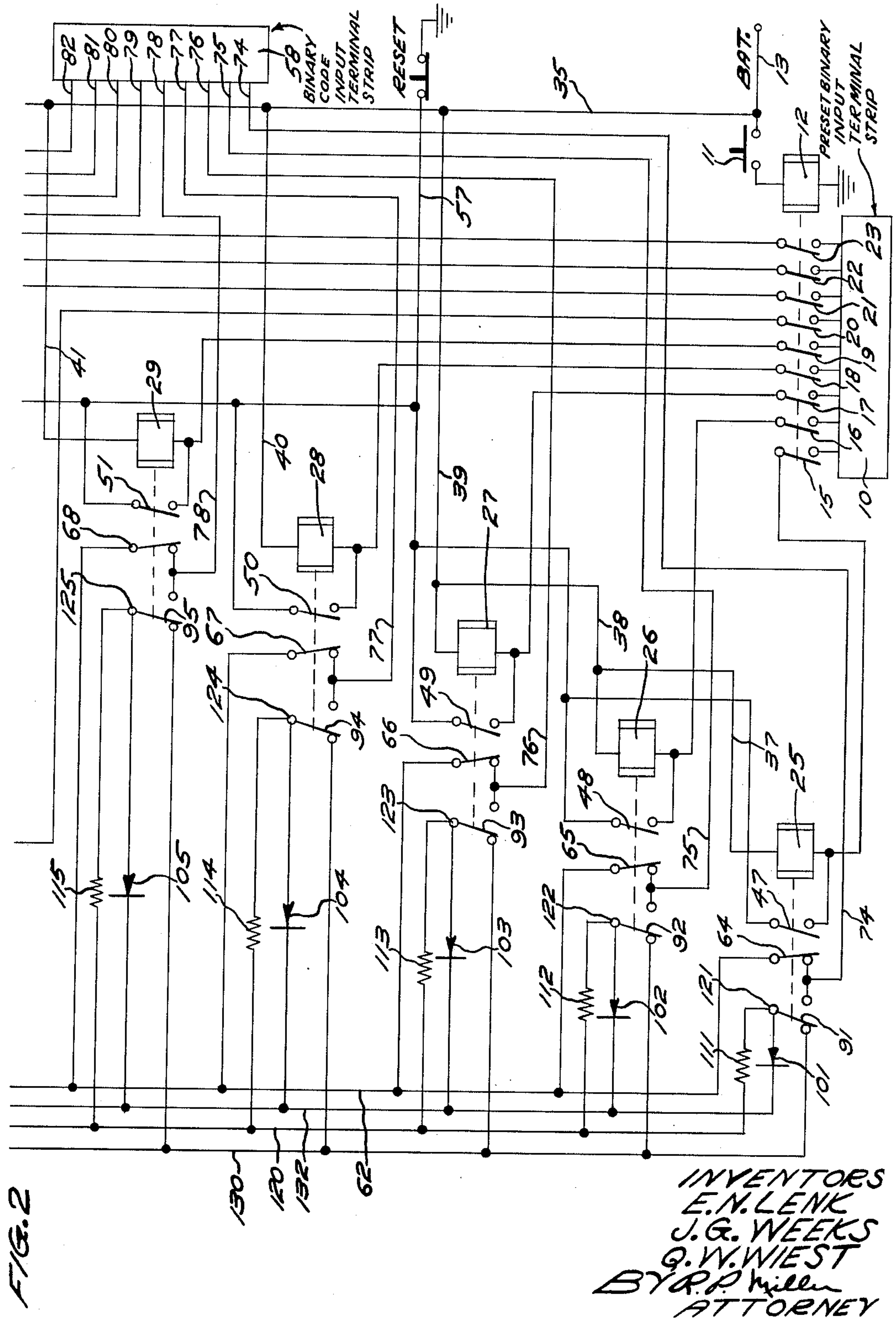

Other objects, advantages and novel features of the invention will become apparent upon consideration of the following detailed description in conjunction with the accompanying drawings wherein FIGS. 1 and 2 are a schematic representation of a coincidence circuit embodying the principal features of the invention.

Referring now to the drawings, a first terminal strip 10 (FIG. 2) is used to apply the preselected binary number to the coincidence circuit. A normally open switch 11 is provided to energize relay 12 by applying battery potential from a battery source 13 to the coil of relay 12; the other side of which is grounded. Actuation of relay 12 effects the closure of contacts 15 to 23, inclusive, to connect a series of coincidence relays 25 to 33 inclusive, to the terminal strip 10. Since battery is being applied to each of these coincidence relays through battery line 35 and their associated leads 37 to 45, inclusive, any of these relays will therefore be energized if the coil thereof is connected to ground through the terminal strip 10.

When using a register of relays, such as relays 25 to 33, to reproduce a binary number, actuated relays represent one binary digit and unactuated relays represent the other binary digit. It is immaterial whether the actuated relays represent the digit "1" or the digit "0" and likewise for the unactuated relays. For the purpose of describing the disclosed embodiment of the invention, the actuated relays are arbitrarily selected to represent the binary digit "1" which then leaves the unactuated relays to represent the digit "0."

Let us assume now that the preselected number to be reproduced in the coincidence relay register is the binary number 101010101. To reproduce this number in the register, it will be necessary to actuate relays 25, 27, 29, 31 and 33. Contacts 15, 17, 19, 21 and 23 and the associated sections of terminal strip 10 must therefore be grounded with the remaining contacts and terminal strip sections presenting open circuits to their associated coincidence relays 26, 28, 30 and 32. This can be accomplished in various ways. For example, each section of the terminal strip 10 associated with a contact on relay 12 could be provided with a single-pole, single-throw switch so that each section could be either grounded or open depending upon the position of the particular switch. The same result could also be accomplished by reading the preselected number out of a memory device in the manner disclosed and claimed in the copending application of E. N. Lenk et al. filed August 7, 1958, Serial No. 753,819. For the purpose of simplifying the remainder of the specification, the application of ground potential to the relay register will be referred to as a voltage pulse whereas the other possible condition constitutes the presentation of an open circuit condition to the relay register.

With the sections of the terminal strip 10 which are associated with contacts 15, 17, 19, 21 and 23 grounded, coincidence relays 25, 27, 29, 31 and 33 will pull in upon actuation of the register relay 12. Actuation of relays 25, 27, 29, 31 and 33 closes associated locking contacts 47, 49, 51, 53 and 55, respectively, to apply ground to the coils of these relays through reset line 57 to which the locking contacts are all connected. When switch 11 has been released to de-energize register relay 12, relays 25, 27, 29, 31 and 33 will remain energized due to the continued application of ground potential through their associated locking contacts. Relays 26, 28, 30 and 32 are provided with locking contacts 48, 50, 52 and 54, but these relays do not lock in since they were not energized in the first instance when register relay 12 was actuated. At this time, the binary number 101010101 has been reproduced in the register of coincidence relays and the circuit is thus ready to begin comparing this number with signals comprising combinations derived from a plurality of closed and open circuit conditions which represent various different binary numbers.

A second terminal strip 58 is provided for the purpose of applying binary coded signals to the coincidence circuit. These signals may emanate from any suitable device. For example, the coded disc described in the aforementioned copending application may be utilized.

It is only necessary that the signals take the form of combinations of closed and open circuit conditions wherein the closed circuits represent binary digits "1" and the open circuits represent the binary digits "0."

With relays 26, 28, 30 and 32 unactuated, a grid 60 (FIG. 1) of a vacuum tube 61 is connected to the terminal strip 58 through a line 62, contacts 65, 67, 69 and 71, and lines 75, 77, 79 and 81. The grid 60 is not connected to the terminal strip 58 through relays 25, 27, 29, 31 and 33 since these relays are actuated or pulled in and, consequently, contacts 64, 66, 68, 70 and 72 are all open. As long as a voltage pulse (ground) is being applied to any of the lines 75, 77, 79 and 81, a closed path is provided which will permit current from a battery 84 to flow through a resistor 85 and line 62 to ground. When current is flowing through the resistor 85, the potential drop thereacross will cause the potential at junction 86 to be substantially equal to the potential at junction 87. As long as this condition prevails, the tube 61 will conduct. Whenever the lines 75, 77, 79 and 81 assume simultaneously their open circuit conditions the current flow through the resistor 85 will cease since all of the paths to ground have been opened. Cessation of current flow through the resistor 85 causes the potential at junction 86 to be reduced to the negative potential of the battery 84. This makes the potential on the grid 60 negative with respect to the cathode 89 and thus stops conduction of the tube 61.

Since the relays of the group of coincidence relays 25 to 33 which are unactuated correspond to the digit "0", cessation of the conduction of tube 61 indicates the application of a binary coded signal, to the terminal strip 58, having the digit "0" in positions corresponding to the digits "0" of the number reproduced in the relay register. In the present instance, this would indicate a binary coded number whose second, fourth, sixth and eighth digits are all "0." In a nine-digit binary code, however, there is a plurality of binary numbers whose second, fourth, sixth and eighth digits are all "0," although there will only be one number in which the remaining digits are all the digit "1." Consequently, the circuit must be capable of selecting from the aforementioned plurality of numbers, the coded binary number which exactly corresponds to the preselected number which is reproduced in the relay register.

For this purpose, the coincidence relays 25 to 33, inclusive, are provided with shorting contacts 91 to 99, associated diodes 101 to 109, and associated load resistors 111 to 119, respectively. Current normally flows from battery line 13 through the line 35, a line 120, and through the load resistors 111 to 119 to junctions 121 to 129, respectively. From here, the currents at junctions 121, 123, 125, 127 and 129 flow through the contacts 91, 93, 95, 97 and 99, by-passing the diodes 101, 103, 105, 107 and 109 and to ground through lines 74, 76, 78, 80 and 82, respectively, whenever a voltage pulse (ground) is applied to any of these lines through the terminal strip 58. Since the relays 26, 28, 30 and 32 are unactuated, contacts 92, 94, 96 and 98 remain in the positions shown in the drawings and the currents at the junctions 122, 124, 126 and 128 will continuously by-pass the diodes 102, 104, 106 and 108 and flow directly to ground through a ground lead 130.

Whenever any of the lines 74, 76, 78, 80 and 82 assumes its open circuit condition the path to ground will be opened and the current at the associated junction will then flow through the associated diode, a line 132, and a resistor 133 (FIG. 1) to ground. As long as current is flowing through the resistor 133 to ground, the potential of junction 134 will be higher than that of junction 135. A grid 137 of a vacuum tube 138 will therefore be maintained at a higher potential than the cathode 139 of the tube 138. With the grid 137 and cathode 139 maintained in this potential relationship, the tube 138 will remain in a conductive state.

Whenever voltage pulses (ground) are simultaneously applied to lines 74, 76, 78, 80 and 82, the current flow through the resistor 133 will cease since all of the diodes 101, 103, 105, 107 and 109 will be shorted out. Cessation of current flow through the resistor 133 causes the potential at junction 134 to be reduced to the potential of junction 135. Since the grid 137 is now at the same potential as the cathode 139, conduction of the tube 138 will cease.

Because the relays of the group of coincidence relays 25 to 33 which are actuated correspond to the digit "1," cessation of conduction of tube 138 indicates the application of a binary coded signal, to the terminal strip 58, having the digit "1" in positions corresponding to the digits "1" of the number reproduced in the relay register. In the present instance, this would indicate a binary coded number whose first, third, fifth, seventh and ninth digits are all "1." In a nine-digit binary code, however, there is a plurality of binary numbers whose first, third, fifth, seventh and ninth digits are all "1," although there will only be one number in which the remaining digits are all "0." Consequently, provision must be made to enable the circuit to coordinate the indications of the tubes 61 and 138 in order to identify the one number of the series being compared which is identical with the preselected number reproduced in the relay register; in the present example, the binary number 101010101.

When tubes 61 and 138 simultaneously cease conduction, this indicates that the combination of voltages then being applied to the terminal strip 58 represent the same binary number as that which is reproduced in the relay register. Coincidence of the two signals has then been obtained and is indicated in the following manner. Simultaneous non-conduction of tubes 61 and 138 causes a cessation of plate current flow through a resistor 140 which is in series with the B+ supply and the plates of these tubes. Since there is no longer a potential drop across the resistor 140, the potential of a junction 141 in the plate circuit will rise to the full value of the B+ supply. This potential rise is impressed on a grid 142 of a thyratron 143 which begins to fire since the cathode 144 thereof is at the lower battery potential. Current flow in the plate circuit of the thyratron 143 will energize a relay 145 to actuate the contacts thereof. The contacts of the relay 145 can be wired into various circuits to perform many operations. For example, the triggering of the thyratron 143 may be utilized to stop drive motors and de-energize magnetic clutches as is the case in the apparatus described in the aforementioned copending application.

It is, of course, obvious that the thyratron 143 and relay 145 may be eliminated in certain applications of the present invention. In such instances, the potential rise at the junction 141 would be used to directly trigger an associated circuit or to initiate a cycle of operations for various apparatus.

It is to be understood that the specific components and circuitry described above are merely illustrative of a preferred embodiment of the invention. Numerous other arrangements may be readily devised by those skilled in the art to achieve a similar circuit which will still embody the principles of the invention and fall within the spirit and scope thereof.

What is claimed is:

1. A coincidence circuit for comparing binary coded signals comprising, a relay register having a relay for each order of the binary signals to be compared, switch means for selectively energizing said relays in correspondence with a first binary coded signal, a pair of circuits to which data bits of all of the various orders of a second binary coded signal may be alternatively applied through the contacts of the corresponding ones of said relays in accordance with the conditions of said relays, first translating means having two alternative conditions incorporated in that one of said circuits to which said data bits are directed by contacts of energized ones of said relays, said translating means being differently responsive to the reception of only data bits arbitrarily designating 1 than to reception of any data bit correspondingly designating 0, and second translating means having two alternative conditions incorporated in that one of said circuits to which data bits are directed by contacts of non-energized ones of said relays, said second translating means being differently responsive to the reception of only data bits designating 0 than to reception of any data bit designating 1.

2. A coincidence circuit for comparing binary coded signals as specified in claim 1 wherein a third translating means having two alternative conditions is responsive to said first and second translating means to indicate identity when said first translating means receives only data bits designating 1 and said second translating means receives only data bits designating 0.

References Cited in the file of this patent

UNITED STATES PATENTS

| | | |
|---|---|---|
| 2,648,829 | Ayres et al. | Aug. 11, 1953 |
| 2,749,533 | Daniels | June 5, 1956 |
| 2,801,405 | Oliwa | July 30, 1957 |
| 2,885,655 | Smoliar | May 5, 1959 |
| 2,900,620 | Johnson | Aug. 18, 1959 |